April 6, 1954 — S. M. RIGGLE — 2,674,234
INTERNAL-COMBUSTION ENGINE
Filed Aug. 27, 1949 — 8 Sheets-Sheet 1

INVENTOR.
Samuel M. Riggle.
BY

April 6, 1954  S. M. RIGGLE  2,674,234
INTERNAL-COMBUSTION ENGINE
Filed Aug. 27, 1949  8 Sheets-Sheet 2
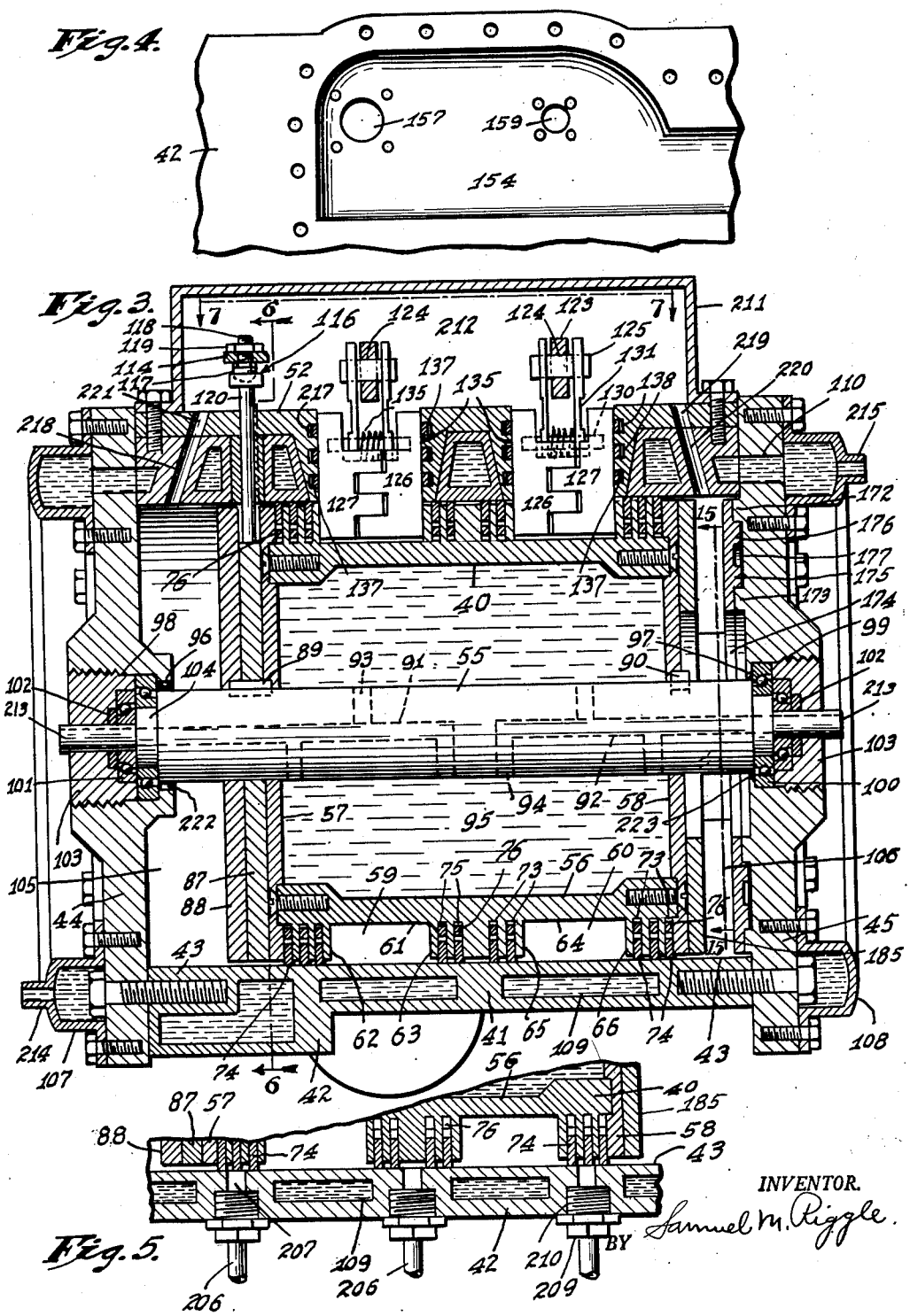

April 6, 1954  S. M. RIGGLE  2,674,234
INTERNAL-COMBUSTION ENGINE
Filed Aug. 27, 1949  8 Sheets-Sheet 3
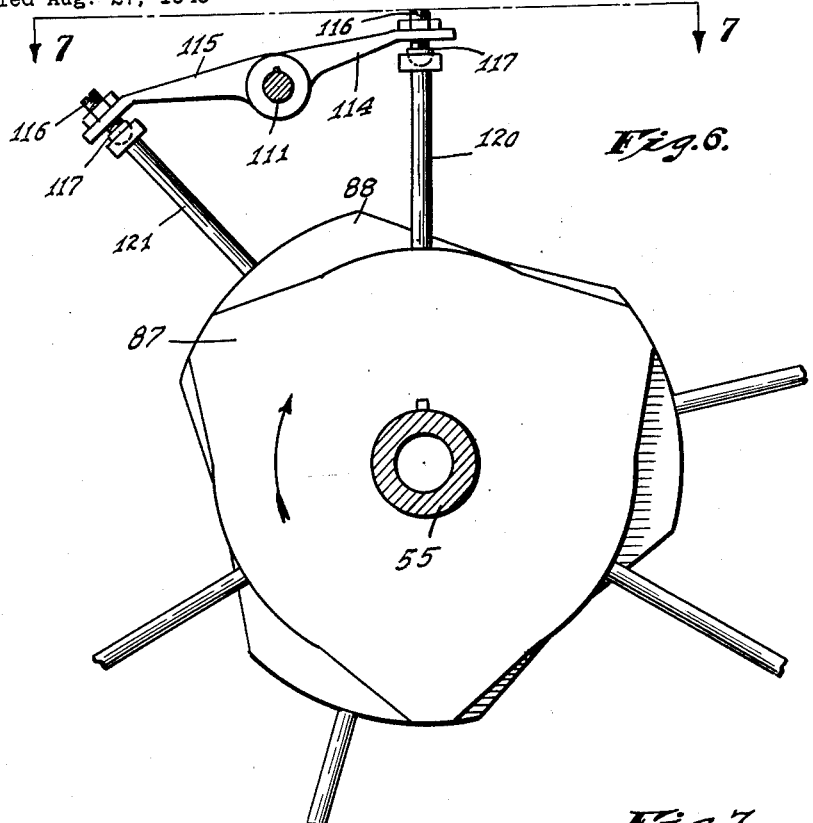
Fig. 6.
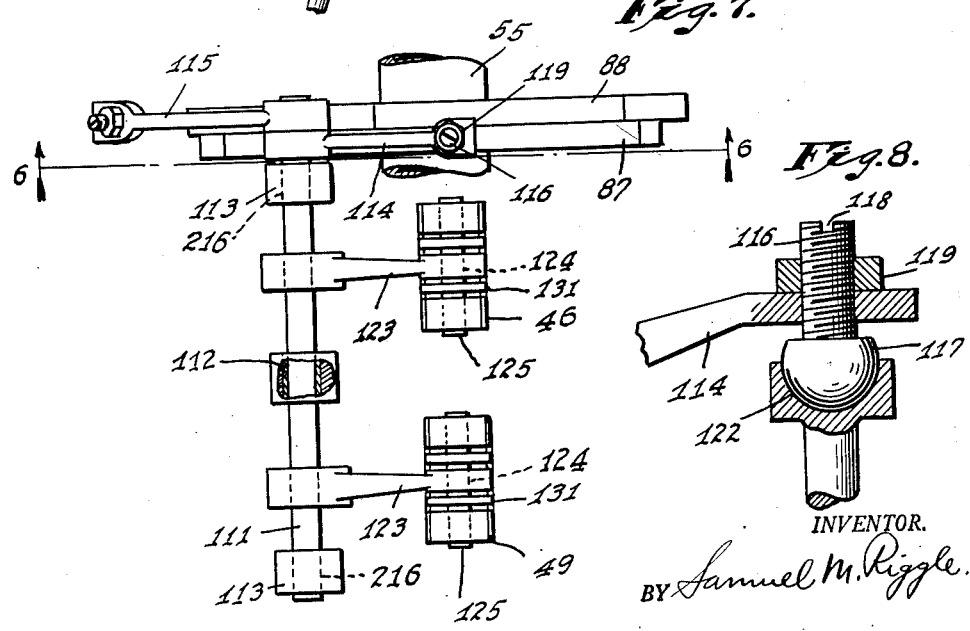
Fig. 7.
Fig. 8.
INVENTOR.
BY Samuel M. Riggle.

April 6, 1954 S. M. RIGGLE 2,674,234
INTERNAL-COMBUSTION ENGINE
Filed Aug. 27, 1949 8 Sheets-Sheet 4
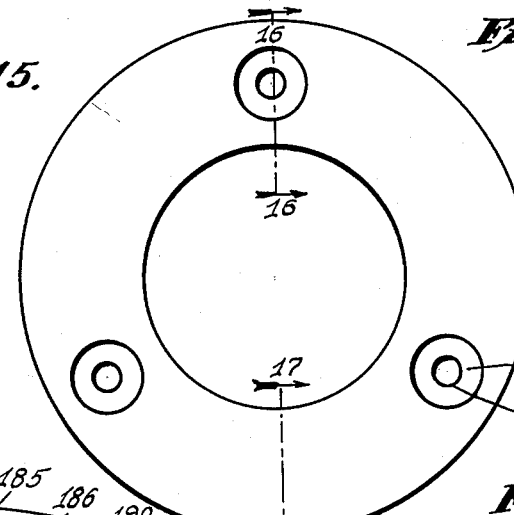
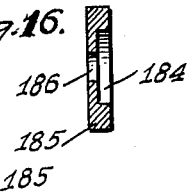
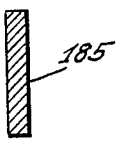
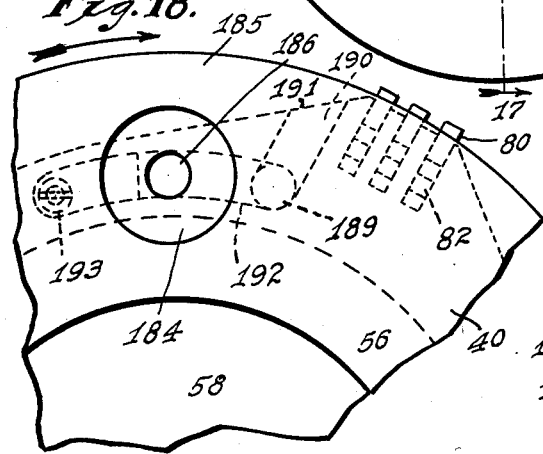
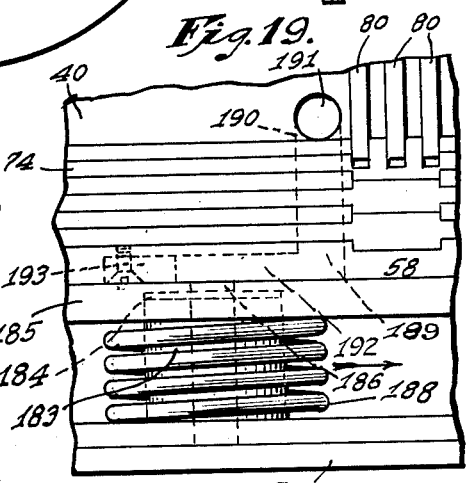
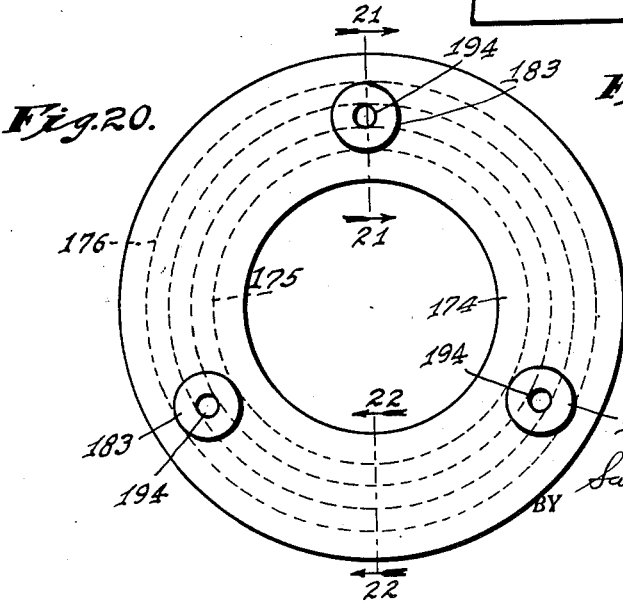
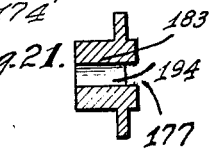
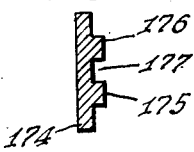
INVENTOR.
Samuel M. Riggle
BY

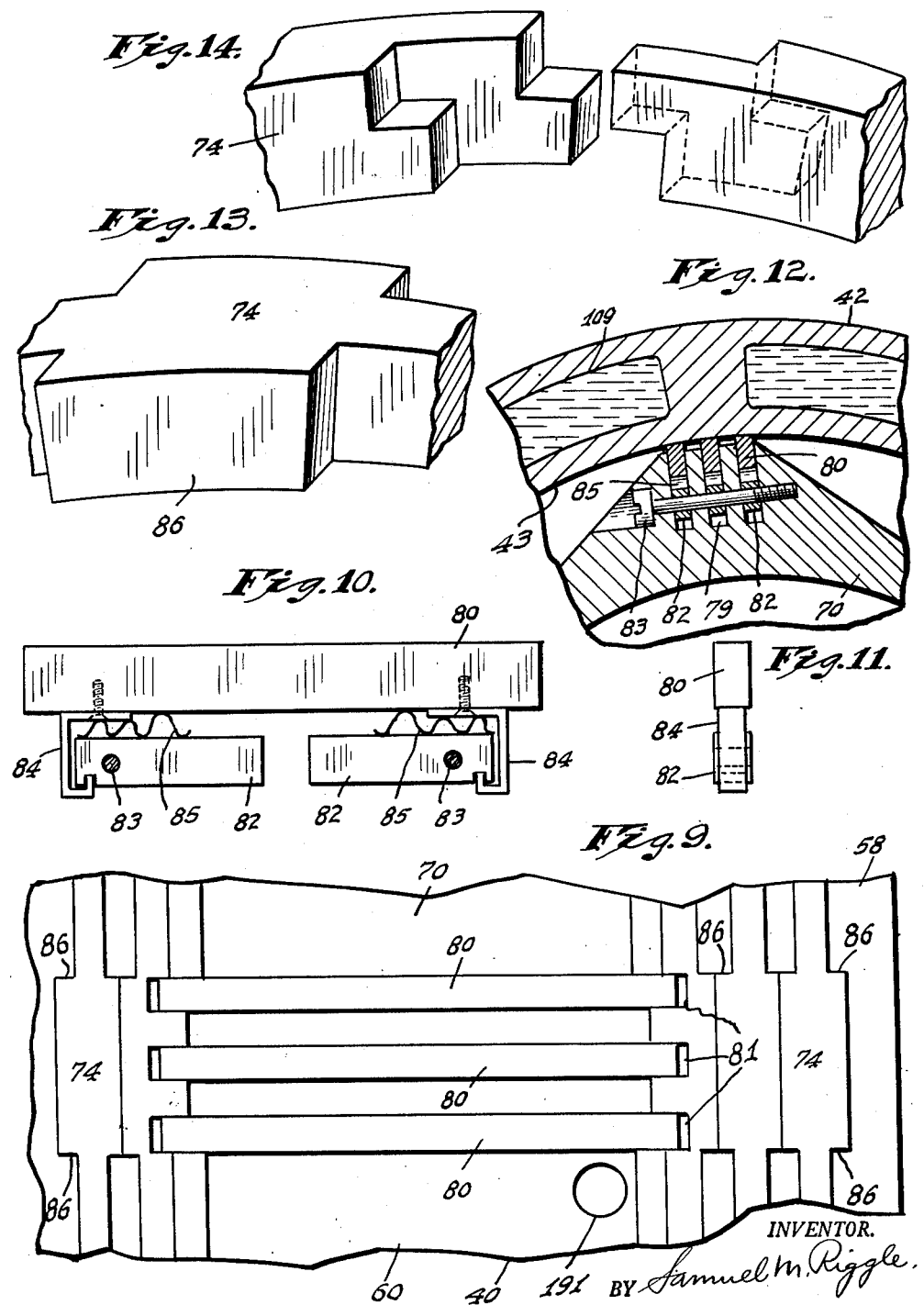

April 6, 1954     S. M. RIGGLE     2,674,234
INTERNAL-COMBUSTION ENGINE
Filed Aug. 27, 1949     8 Sheets-Sheet 6
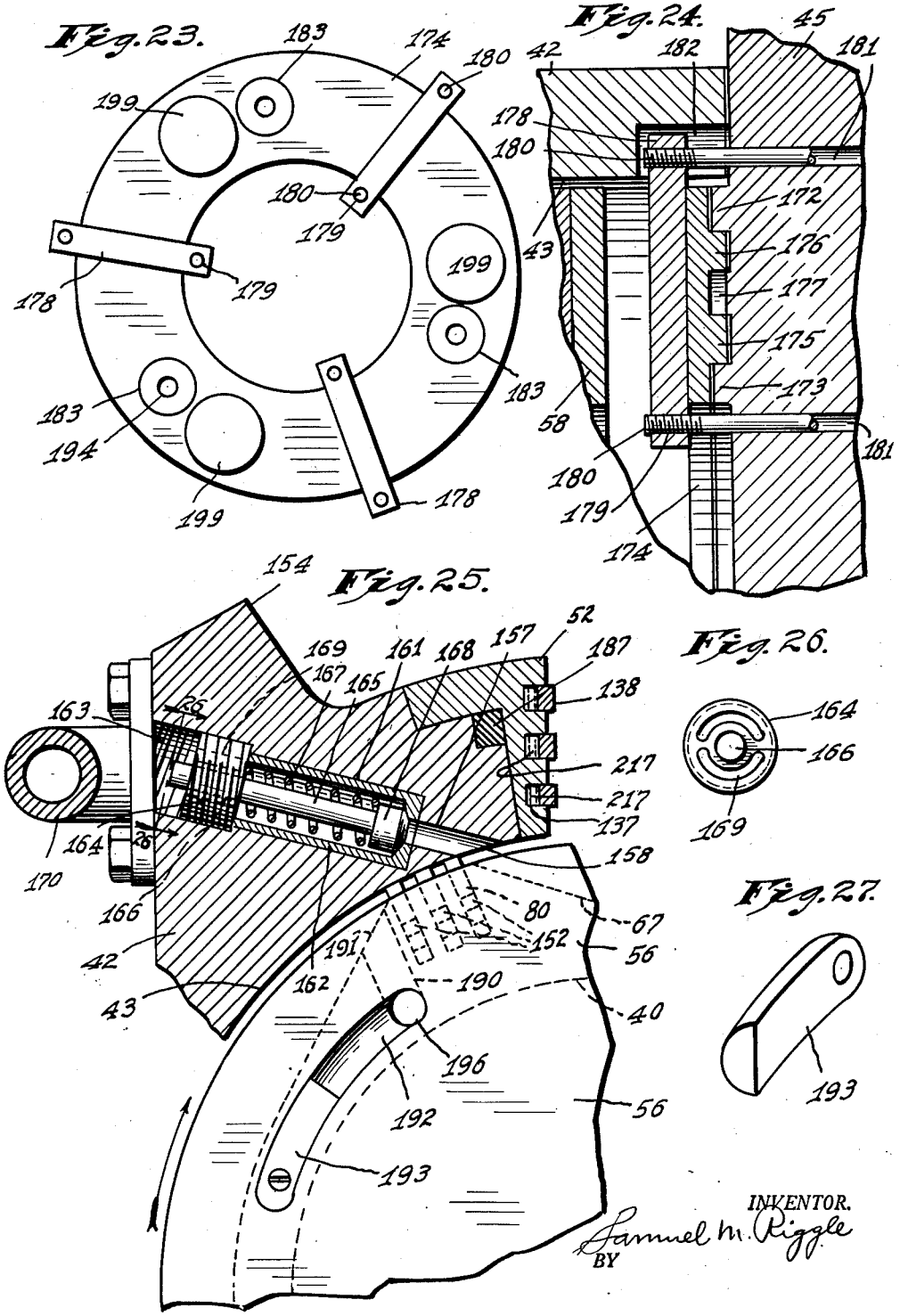
INVENTOR.
Samuel M. Riggle
BY April 6, 1954  S. M. RIGGLE  2,674,234
INTERNAL-COMBUSTION ENGINE
Filed Aug. 27, 1949  8 Sheets-Sheet 7

INVENTOR.
BY Samuel M. Riggle.

April 6, 1954  S. M. RIGGLE  2,674,234
INTERNAL-COMBUSTION ENGINE
Filed Aug. 27, 1949  8 Sheets-Sheet 8
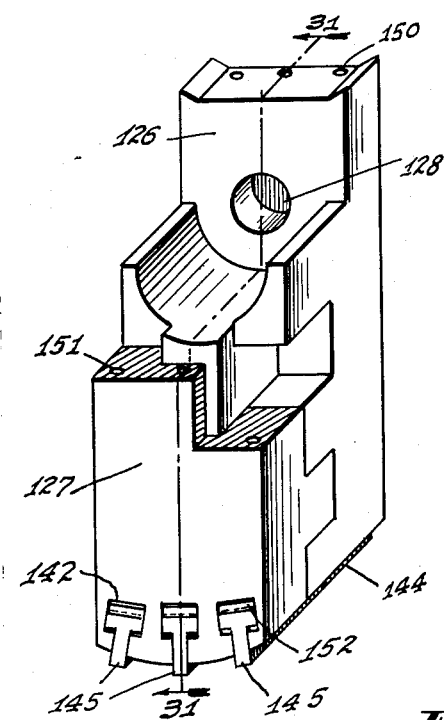
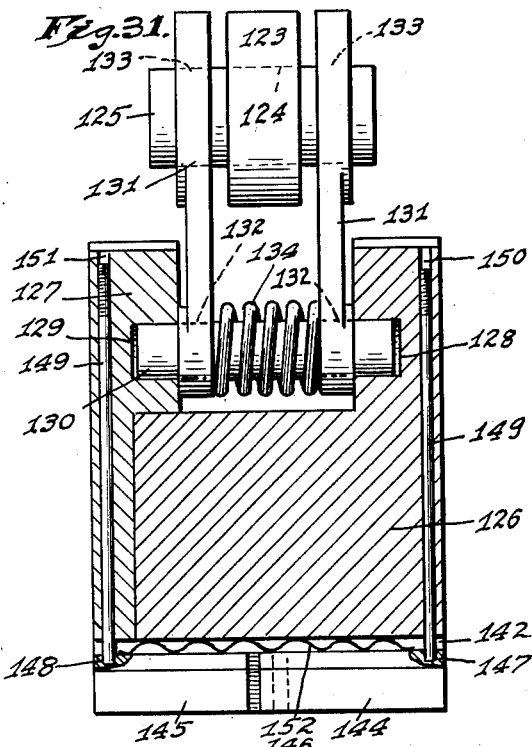
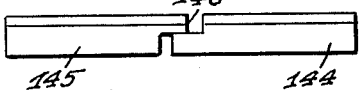
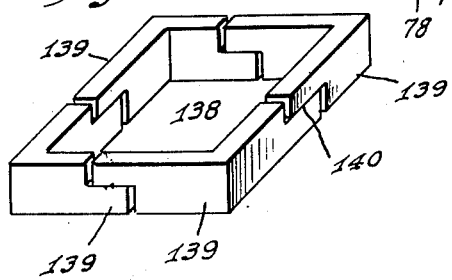
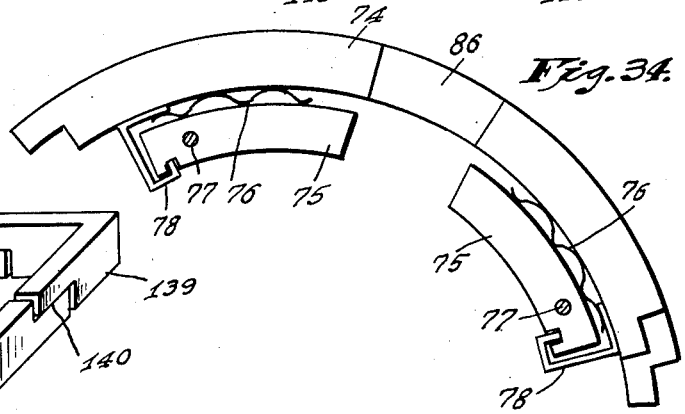
INVENTOR.
Samuel M. Riggle
BY Patented Apr. 6, 1954

2,674,234

UNITED STATES PATENT OFFICE 2,674,234

INTERNAL-COMBUSTION ENGINE

Samuel M. Riggle, Manilla, Ind.

Application August 27, 1949, Serial No. 112,758

8 Claims. (Cl. 123—15)

The present invention relates to internal combustion engines, and is particularly concerned with the rotary type of internal combustion engines.

The present invention is particularly adapted for use in automobiles, trucks, and tractors; but it is also suitable for use in ships and locomotives and stationary power installations, where a relatively low ratio of horsepower power output per pound of weight is permissible, and also in airplanes, where a relatively high ratio of horsepower power output per pound of weight is necessary and desirable. Although I anticipate that the principal use of the present invention will be in automobiles, trucks, and tractors, I do not wish to limit myself to those usages or to any particular usage, since the principle of the present invention is suitable for general application in providing a rotary source of power.

Although the embodiment of the present invention which I show herein illustrates a rotary internal combustion engine adapted to the use of carbureted gasoline for fuel, ignited by spark plugs, I desire it to be understood that certain structures of the present engine are adapted to use in other types of internal combustion engines, notably the diesel type, with corresponding advantages in power output, efficiency, ease of manufacture, cheap and easy replacement of worn parts, and so forth.

One object of the present invention is to provide an improved rotary internal combustion engine which may be easily and cheaply manufactured, which is efficient and reliable in operation, and which may be easily and cheaply repaired by replacing worn or damaged parts with new ones.

Another object of the present invention is to provide an improved rotary internal combustion engine having an improved compression-transfer system providing compression-transfer timing and adjustment, and having a compression-transfer flashport ring automatically counterbalanced with respect to the pressure of the gases in the firing chambers exerted against the flashport ring.

Another object of the present invention is to provide an improved rotary internal combustion engine having automatic adjustment to thermal contraction and expansion of rotor and stator and their various parts.

The drawings show a rotary internal combustion engine embodying the present invention. Referring now to the drawings, of which there are eight sheets, Fig. 1 is a sectional view, taken on a plane at right angles to the main axis, showing details of stator and rotor;

Fig. 3 is a sectional view cut at lines 3—3 of Fig. 1 and looking in the direction of the arrows;

Fig. 4 is a perspective view of the compression-transfer outlet port and the exhaust port and their abutment, looking in the direction and from the position of the arrows 4—4 of Fig. 1;

Fig. 5 is a fragmentary section cut on a plane 5—5 of Fig. 1, showing the pressure oiling tubes and their positions;

Fig. 6 is a perspective view of the cams and their push rods and the rocker arm shaft and its rocker arms, looking from and in the direction of the arrows 6—6 of Fig. 3;

Fig. 7 is an elevational view of the cams, rocker arm shaft and its bearings, the rocker arms, the valve arms and the valves, looking in the direction of the arrows 7—7 of Fig. 3, and in the direction of the arrows 7—7 of Fig. 6;

Fig. 8 is a fragmentary view of one of the push rods and its rocker arm and the rocker arm adjustment;

Fig. 9 is a fragmentary elevational view of the rotor and a vane showing the seal bars and the seal rings, in position, looking from and in the direction of the arrows 9—9 of Fig. 1;

Fig. 10 is a side view of a seal bar and its centrifugal counterbalances and its seal bar springs and its mounting means;

Fig. 11 is a perspective end view of a seal bar and a seal bar centrifugal counterbalance and its mounting means;

Fig. 12 is a fragmentary sectional view of a vane showing vane seal bars, vane seal bar springs, and vane seal bar centrifugal counterbalances and the vane counterbalance fulcrum pin in position;

Fig. 13 is a fragmentary perspective of a seal ring segment showing the ring abutments;

Fig. 14 is a fragmentary perspective view of the complementary ends of two adjoining segments of a seal ring, showing gas-tight slip-joints;

Fig. 15 is an axial perspective of the compression-transfer flashport ring, looking in the direction of the arrows 15—15 of Fig. 3;

Fig. 16 is a sectional view of the compression-transfer flashport ring cut at the line 16—16 of Fig. 15 and looking in the direction of the arrows;

Fig. 17 is a sectional view of the compression-transfer flashport ring, cut at the line 17—17 of Fig. 15 and looking in the direction of the arrows;

Fig. 18 is a fragmentary perspective of the compression transfer flashport ring, looking in the direction of the arrows 15—15 of Fig. 3, showing the rotor compression-transfer conduits, an arc-shaped compression-transfer channel, a space-charge control lug, at the phase of rotation during which the compression-transfer system operates to charge the space of the explosion chambers;

Fig. 19 is a fragmentary elevational view of the rotor showing the rotor compression-transfer conduits, the compression-transfer flashport ring, and the compression-transfer timing ring at the phase of rotation during which the compression-transfer system operates to charge the space of the explosion chambers, looking in the direction of the arrows 19—19 of Fig. 18;

Fig. 20 is a view of the compression-transfer timing ring looking in the direction of the arrows 20—20 of Fig. 3;

Fig. 21 is a sectional view of the compression-transfer timing ring cut at a line 21—21 of Fig. 20 and looking in the direction of the arrows;

Fig. 22 is a sectional view of the compression-transfer timing ring cut at the line 22—22 of Fig. 20 looking in the direction of the arrows;

Fig. 23 is a diagrammatic view of the compression-transfer timing ring, showing the timing ring bosses, the flashport ring Sylphons, and the timing ring clamp bars, looking axially from the rotor power stroke-exhaust end plate toward the stator power stroke-exhaust end plate;

Fig. 24 is a fragmentary sectional view, showing the method of clamping the compression-transfer timing ring to the stator end plate;

Fig. 25 is a fragmentary sectional view of the stator and rotor, showing the stator compression-transfer discharge conduit, the compression-transfer check valve, and the compression-transfer external manifold;

Fig. 26 is a surface view of the compression-transfer check valve guide, looking from the direction of the arrow 26 of Fig. 25;

Fig. 27 is a perspective of the space charge control lug;

Fig. 30 is a cut-away perspective view of a valve, showing the complementary segments of the same;

Fig. 31 is a sectional view of a valve cut along the arrows 31—31 of Fig. 30 with parts added;

Fig. 32 is a perspective view of a segmented valve seal showing the gas-tight slip-joints;

Fig. 33 is a radial view of a valve seal bar, showing its gas-tight slip-joint.

Fig. 34 is an axial view of a seal ring segment and its seal ring centrifugal counterbalances.

Figure 1:
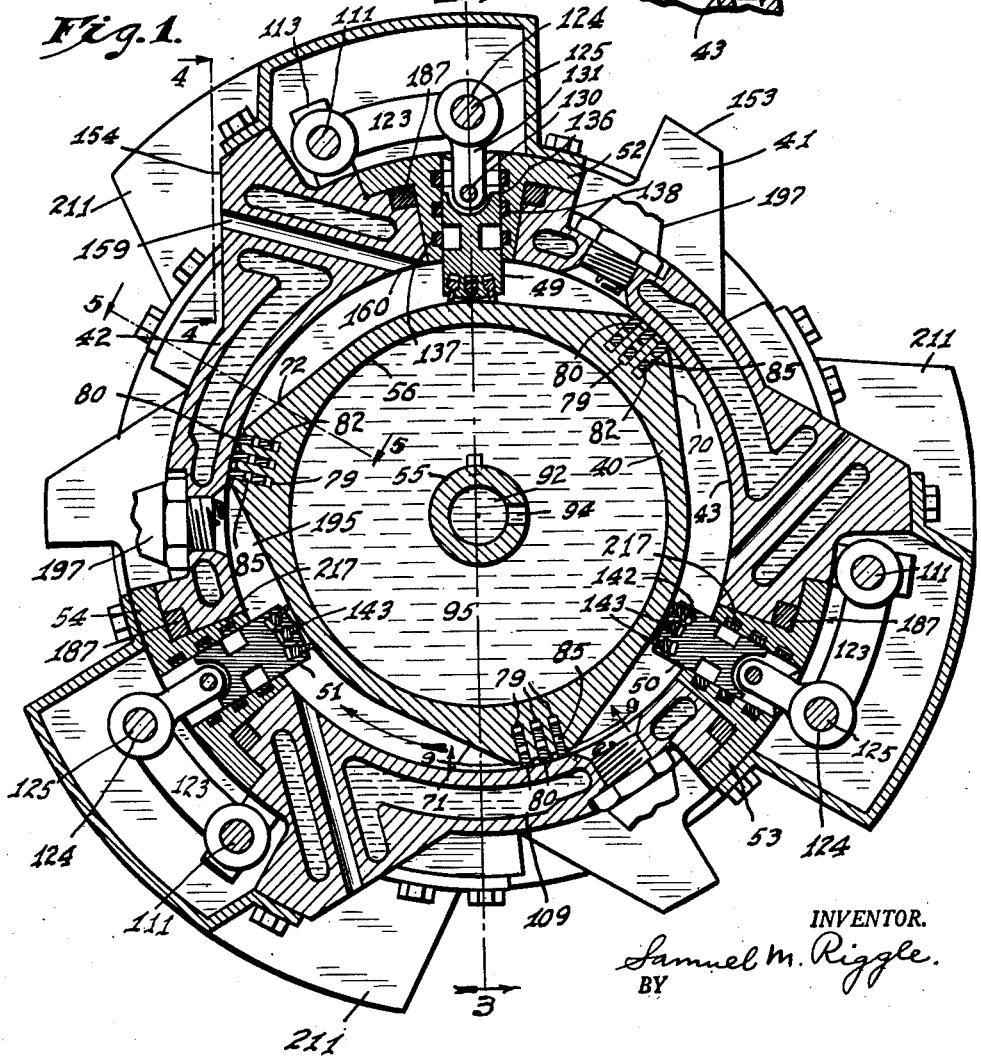

We refer now to Fig. 1 and Fig. 3. The present engine comprises a rotor, indicated by the numeral 40, and a stator indicated by the numeral 41. The stator has a shell 42, having an inner cylindrical wall 43. The stator has an intake-compression end plate 44, and a power stroke-exhaust end plate 45.

The said stator carries a plurality of valves slidably mounted in valve sleeves mounted in openings through said stator shell 42. The present engine has three intake-compression valves, of which one numbered 46 may be seen in the present drawings, see Fig. 2; and it has three power stroke-exhaust valves numbered 49, 50, 51. There are three valve sleeves numbered 52, 53, 54. In the present engine an intake-compression valve and a power stroke-exhaust valve are mounted in each valve sleeve. Thus a power stroke-exhaust valve is axially in line with each intake-compression valve. But I desire to make it clear that the power stroke-exhaust valves may be staggered with respect to the intake-compression valves without departing from the principles of the present invention.

Said rotor 40 has a main axial shaft 55, and a rotor shell 56, a rotor intake-compression end plate 57, and a rotor power stroke-exhaust end plate 58.

Said rotor shell 56 has an annular intake-compression channel 59, and an annular power stroke-exhaust channel 60. Said intake-compression channel 59 has a cylindrical wall 61 and side walls 62 and 63. The power stroke-exhaust channel 60 has a cylindrical wall 64 and side walls 65 and 66.

The rotor shell 56 of the present engine has three intake-compression vanes, and the present drawings show one of them numbered 67; and it has three power stroke-exhaust vanes 70, 71, 72.

Said rotor shell 56 has a plurality of seal ring channels 73 at each axial end of said rotor shell and at the axial center of said rotor shell between said rotor intake-compression channel and said rotor power stroke-exhaust channel.

Mounted in the seal ring channels 73 are a plurality of segmented seal rings 74, engaging the inner cylindrical wall 43 of said stator. Also mounted in said seal ring channels 73, behind said seal rings 74, are a plurality of seal ring centrifugal counterbalances 75 and seal ring springs 76. The seal ring springs 76 are flat, wavy, arc-shaped springs. The seal ring centrifugal counterbalances 75 are mounted on seal ring counterbalance fulcrum pins 77. Fulcrum pins 11 are mounted in bores at axial right angles to seal ring channels 73 appropriately spaced around the periphery of rotor shell 56 and rotor end plates 57 and 58 and through said end plates 57 and 58 and through the castellated portions of rotor shell 56 which form seal ring channels 73. The seal ring centrifugal counterbalances 75 are coupled at the segmented seal rings 74 by the seal ring counterbalance links 78, see Fig. 34.

Said vanes 67 and 70 to 72 have a plurality of axial channels 79 in which are mounted vane seal bars 80 engaging the inner cylindrical wall 43 of said stator. Referring now to Fig. 9, the said segmented seal rings 74 adjacent to said intake-compression channel 59 and said power stroke-exhaust channel 60 have openings 81 accommodating the ends of said vane seal bars 80 in gas-tight slip joints.

Vane seal bar centrifugal counterbalance 82, linked to said vane seal bars 80 by vane seal bar counterbalance links 84, and vane seal bar springs 85, best shown in Fig. 10, are mounted in said vane axial channels 79 behind said vane seal bars 80 on vane counterbalance fulcrum pins 83. The seal ring counterbalance links 78 and the vane seal bar counterbalance links 84 are preferably made of resilient metal.

Said segmented seal rings 74 have shoulders 86, see Fig. 9, projecting into openings along the sides of said seal ring channels 73, by which means said seal rings are carried into rotation with said rotor. Said vane seal bar centrifugal counterbalances 82 are mounted on vane counterbalance fulcrum pins 83, best shown in Fig. 10 and Fig. 12. Said segmented seal rings 74 have three-dimensional gas-tight slip-joints between the segments of same, as shown in Fig. 14. In the present engine each of the said segmented seal rings comprises three segments.

Mounted on the axial shaft 55 between the rotor intake-compression end plate 57 and the stator intake-compression end plate 44 is a valve-lifting cam 87 and a valve depressing cam 88. The rotor end plate 57 and the valve-lifting cam 87 and the valve-depressing cam 88 are keyed to the axial shaft 55 by means of a key 89. Said rotor power stroke-exhaust end plate 58 is keyed to said axial shaft 55 by means of key 90.

Said axial shaft 55 has a central axial bore 91 on the intake-compression end of same and a central bore 92 on the power stroke-exhaust end of same. Said rotor shell 56 has an inner chamber 95 which serves as a coolant chamber. Radial bores 93 through the intake-compression end of axial shaft 55 communicate between axial bore 91 and said rotor inner chamber 95; and radial bores 94 through the power stroke-exhaust end of axial shaft 55 communicate between the axial bore 92 and said rotor inner chamber 95.

Said rotor shell 56 is concentrically fixed by suitable means to the rotor end plates 57 and 58. Said stator shell 42 is concentrically fixed by suitable means to stator end plates 44 and 45. The stator end plates 44 and 45 have centrally located axial bores 96 and 97 for receiving axial shaft 55 and counterbores 98 and 99 for receiving radial bearings 100, thrust bearings 101, packing rings 102, and bearing retainers 103.

Said axial shaft 55 has a reduced cylindrical portion 104 at each end to accommodate said radial bearings 100, and a further-reduced cylindrical portion 213 at each end of said shaft 55 to accommodate the thrust bearings 101 and the packing rings 102. Said counterbores 98 and 99 have threaded outer portions to accommodate the threaded bearing retainers 103. A special wrench to fit bearing retainers 103 permits the axial adjustment of the shaft 55 and the endplay between the thrust bearings 101.

The space between the stator end plate 44 and the rotor end plate 57 forms the oil chamber 105. The space between stator end plate 45 and rotor end plate 58 forms oil chamber 106.

Stator end plates 44 and 45 have fixed by suitable means on their outer walls coolant distribution rings 107 and 108 having bosses 214 and 215 for the inlet and the outlet of the coolant fluid for the stator, see Fig. 3. Stator shell 42 has suitable coolant channels 109, see Fig. 3, communicating with the coolant distribution rings 107 and 108 through openings 110 in stator end plates 44 and 45.

The rocker arm shafts 111 are mounted axially through bores 216, in bearings 112 borne by abutments 113, see Fig. 7. Suitably fixed to the rocker arm shafts 111 are the rocker arms 114 extending in a forward direction over the valve-lifting cam 87, see Fig. 7. Suitably fixed to the rocker arm shafts 111 are the rocker arms 115 extending in a backward direction over the valve-depressing cam 88, see Fig. 7.

Rocker arms 114 and 115 bear in threaded bores through their outer ends the valve clearance adjustments 116, having on their radially-inward ends a ball-shaped structure 117 and on their radially-outward ends a screw-driver slot 118 by which the clearance adjustment is made, see Fig. 8. The valve clearance adjustments 116 are locked in place by locknuts 119. Push rods 120 and pushrods 121 acts as followers for cams 87 and 88 respectively, see Fig. 6. The push rods 120 and the push rods 121 bear on their radially outward ends cup-shaped sockets 122 for receiving the ball-shaped ends 117 of the valve clearance adjustments 116, see Fig. 8.

The rocker arm shafts 111 have affixed in a forward-extending direction over the valves 46 and 49 to 51 the valve arms 123, see Fig. 1 and Fig. 7. Through axial bores 124 in the forward-extending ends of valve arms 123 are fixed the valve arm pins 125. The valves 46 and 49 to 51 are comprised each of two interlocking complementary segments 126 and 127, see Fig. 30.

The valve segments 126 and 127 have axial bores 128 and 129 accommodating valve pins 130, see Fig. 31. Valve links 131 have axial bores 132 on their radially-inward ends accommodating valve pins 130, and axial bores 133 on their radially-outward ends accommodating valve arm pins 125, see Fig. 31. A valve link 131 is mounted on the valve arm pins 125 on each side of the valve arms 123 and on the valve pins 130 adjacent to the valve segments 126 and 127. The valve spreader spring 134 is mounted on valve pin 130 between the two valve links 131 serving each valve resiliently urging valve segments 126 and 127 axially apart and into engagement with the end walls 135 of valve sleeves 52—54, see Fig. 3.

Valve sleeves 52—54 have valve sleeve grooves 137 running continuously around the end walls 135, see Fig. 3, and the side walls 136 of valve sleeves 52—54, see Fig. 1. Mounted in the valve sleeve grooves 137 are the segmented valve seals 138. The valve seals 138 are formed of four segments 139, each segment having an end portion at right angles to a side portion, the adjoining ends of said valve seal segments 139 having complementary portions forming gas-tight slip-joints 140, see Fig. 32.

The valve sleeves 52—54 are fitted into the openings of stator shell 42, the joints being made gas-tight by means of packings 187, see Fig. 25.

Mounted in valve sleeve grooves 137 behind valve seals 138 are the valve seal springs 217, which are flat wavy springs, urging the valve seal segments 139 resiliently into engagement with the side walls and the end walls of valves 46 and 49 to 51, see Fig. 1 and Fig. 3. Extending axially along the radially-inward walls of valves 46 and 49 to 51 are a plurality of T-shaped grooves 142, see Fig. 30 and Fig. 1. Mounted in the T-shaped grooves 142 are the T-shaped segmented valve seal bars 143. Said valve seal bars 143 are each formed of two segments numbered 144 and 145, which have on their adjoining ends complementary portions forming gas-tight slip-joints 146, see Fig. 33.

The outer ends of said valve seal bar segments 144 and 145 have bores 147 and 148 accommodating the radially inward ends of valve seal bar alignment pins 149, see Fig. 31. The valve segments 126 and 127 also have bores numbered 150 and 151 threaded at their radially-outward ends, in alignment with and communicating with the T-shaped grooves 142 and near the outer ends of same, see Fig. 31. The valve seal bar alignment pins 149 are mounted in bores 150 and 151 and engage bores 148 and 147 of segments 144 and 145, thus holding the outer ends of segments 144 and 145 flush with the outer walls of valve segments 126 and 127. The thermal expansion and contraction of valve seal bar segments 144 and 145 is accommodated by the gas-tight slip-joint 146.

Valve seal bar springs 152, which are flat wavy springs, are mounted in the T-shaped grooves 142 behind the valve seal bars 143 and between the seal bar alignment pins 149, urging said valve seal bars radially inward into engagement resiliently with the rotor cylindrical walls 61 and 64 and the rises of vanes 67 and 70 to 72.

The valve seal bar alignment pins 149 have screwdriver slots on their radially outward ends, by which means the threaded portion of said seal bar alignment pins may be made to engage the threaded portion of alignment pin bores 150 and 151 of the valve segments 126 and 127.

Figure 2:
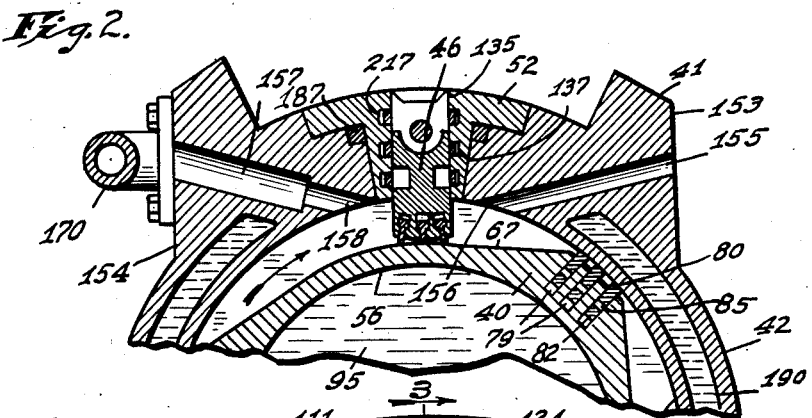
Fig. 2 is a fragmentary sectional view cut on a plane at right angles to the main axis, through an intake-compression valve, showing an intake conduit and a compression-transfer outlet conduit.

The stator shell 42 carries the inlet abutments 153 located on the periphery of said stator shell, on the intake-compression end of same and in direction of rotation just after the said valve sleeves, see Fig. 1 and Fig. 2. The stator shell 42 also carries the outlet abutments 154 on the periphery of said stator shell just before said valve sleeves, see Fig. 1 and Fig. 2 and Fig. 4.

The said inlet abutments 153 have intake conduits 155 with their inner ports 156 located in the stator cylindrical wall 43 near and in direction of rotation just after the radially-inward portion of the intake-compression end of valve sleeves 52—54, see Fig. 2.

The said outlet abutments 154 have the compression transfer outlet conduits 157 with their inner ports 158 located in the stator cylindrical wall 43 near and in the direction of rotation just before the radially-inward portion of the intake-compression end of valve sleeves 52—54, see Fig. 2.

The outlet abutments 154 also have exhaust conduits 159 with their inner ports 160 located in the stator cylindrical wall 43 near and in direction of rotation just before the radially-inward portion of the power stroke-exhaust end of valve sleeves 52—54, see Fig. 1.

The bores of compression transfer outlet conduits 157 have counterbores 161, accommodating check valve seats 162, and threaded counterbores 163 accommodating threaded check valve guides 164, see Fig. 25. The check valves 165 are mounted in the check valve seats 162 with the valve stems engaging the bores 166 of the check valve guides 164. The check valve springs 167, which are helically coiled, are mounted around the stems of check valves 165 between check valve guides 164 and the check valve disks 168, see Fig. 25. The check valve guides 164 have arc-shaped openings 169, to permit the egress of the compressed fuel-air mixture, see Fig. 26.

The compression-transfer external manifolds 170 are mounted with one end of same fixed by suitable means to outlet abutments 154 and communicating with the compression-transfer outlet conduits 157, see Fig. 25. The other end of said compression-transfer external manifolds are fixed by suitable means to the stator power stroke-exhaust end plate 45, communicating with the compression-transfer conduits 171 of end plate 45, see Fig. 28.

Figure 28:
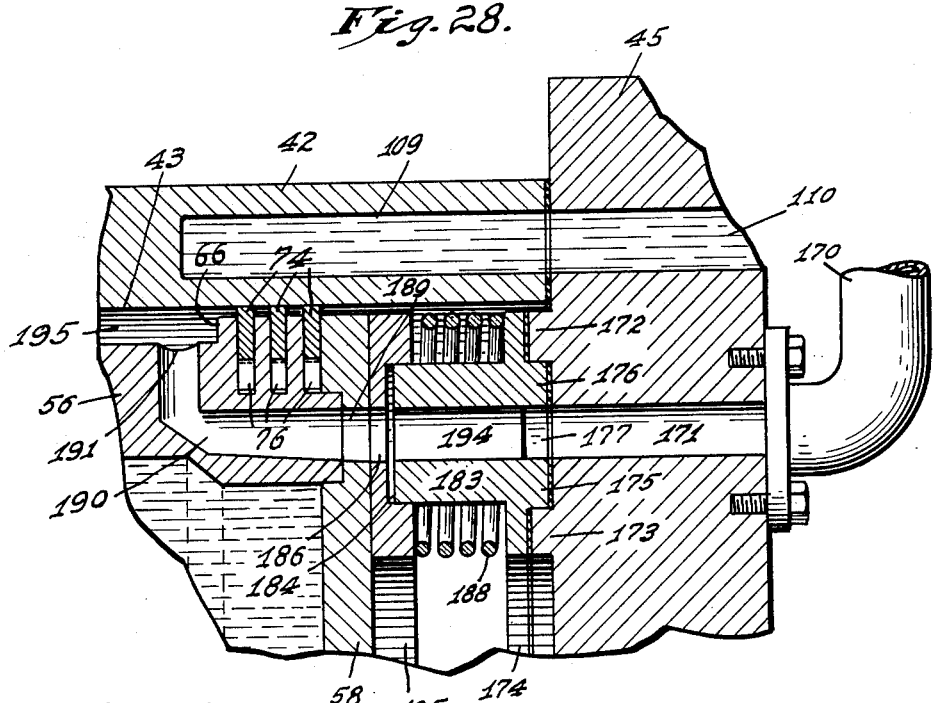
Fig. 28 is a fragmentary sectional view showing the rotor compression-transfer conduit, the compression-transfer flashport ring, the compression-transfer timing ring, the stator power stroke-exhaust end plate conduit, and the compression-transfer external manifold, showing the compression-transfer cycle at the point of charging the explosion chambers.

Said end plate 45 has annular ribs 172 and 173 projecting from the inner wall of same, see Fig. 28. The compression-transfer timing ring 174 is mounted concentrically on the inner wall of end plate 45. Said timing ring 174 has two annular ribs 175 and 176, forming interlocking gas-tight joints with the end plate 45 and its annular ribs 172 and 173, see Fig. 24. The space between the annular ribs 175 and 176 of said timing ring 174 forms an annular pressure-equalizing conduit 177, by which means the compression-transfer pressure made available to each of the explosion chambers is equalized.

The compression-transfer timing ring 174 is clamped into place by clamp bar 178, having threaded bores 179 at each end for receiving the threaded ends of clamp bar studs 180. The end plate 45 has a plurality of clamp bar stud bores 181, through which the said clamp bar studs are projected into engagement with the threaded bores 179 of clamp bars 178, see Fig. 24. Said stator shell 42 has on its inner cylindrical wall 43 the recessed portions 182 to accommodate the clamp bars 178 and the outer clamp bar studs 180, see Fig. 24.

The said timing ring 174 carries the axially inward extending bosses 183, which engage the counterbores 184 of the flashport ring 185 with gas-tight slip-joints, see Fig. 28. The flashport ring 185 has flashport bores 186 communicating with the compression-transfer timing ring 174 and its bosses 183, see Fig. 28. The flashport ring springs 188, which are helical in form, are mounted around the timing ring bosses 183 and between the compression-transfer timing ring 174 and the flashport ring 185, and said flashport ring springs resiliently urge said flashport ring axially inward into engagement with rotor end plate 58, see Fig. 28.

Said rotor end plate 58 has compression-transfer conduits 189; and rotor shell 56 has compression-transfer conduits 190, see Fig. 28. Said compression-transfer conduits 190 extend axially inward slightly past a point radially in line with the power stroke-exhaust channel side wall 66, see Fig. 29, then extends radially outward, terminating with the rotor inside ports 191, see Fig. 19.

The compression-transfer conduits 189 are concentrically spaced in a circle having the same radius as that of the circle locating flashport bores 186. The arc-shaped space charge control channels 192, extending backwards from the compression-transfer conduits 189, are equipped at their backward ends with the space charge control lugs 193, see Fig. 18 and Fig. 19. The control lugs 193 close the backward end of channels 192, and in effect determine the termination of channel 192, thus determining the point of rotation at which the compression-transfer gases cease to flow into the explosion chambers.

The rotor inside ports 191 are located on the rise of the cam-shaped vanes 70—72 and in direction of rotation just after the dwell or rest of said cam-shaped vanes, see Fig. 18. Thus in proper phase of rotation the compression-transfer gases flow from the external manifold 170 through conduits 171 of end plate 45 and through conduits 194 of compression-transfer timing ring 174 and its bosses 183, through conduits 186 of flashport ring 185, through conduits 189 of rotor end plate 58, and through conduits 190 of rotor shell 56 into explosion chambers 195, see Fig. 28.

During the phase of rotation when the explosion chambers 195 are not being charged with the compression-transfer gases, that is, when the rotor outside ports of conduits 189 of end plate 8 are not in registration with flashport bores 186, the flashport ring 185 seals the end of conduits 189 and arc-shaped channels 192 of end plate 58, and end plate 58 seals the ends of flashport bores 186 of flashport ring 185.

Ignition means for explosion chambers 195 is provided by spark plugs 197 mounted in threaded bores through stator shell 42 into recesses communicating with explosion chambers 195, said spark plugs being mounted near to and in direction of rotation just after the power stroke-exhaust valves 49—51, see Fig. 1.

Figure 29:
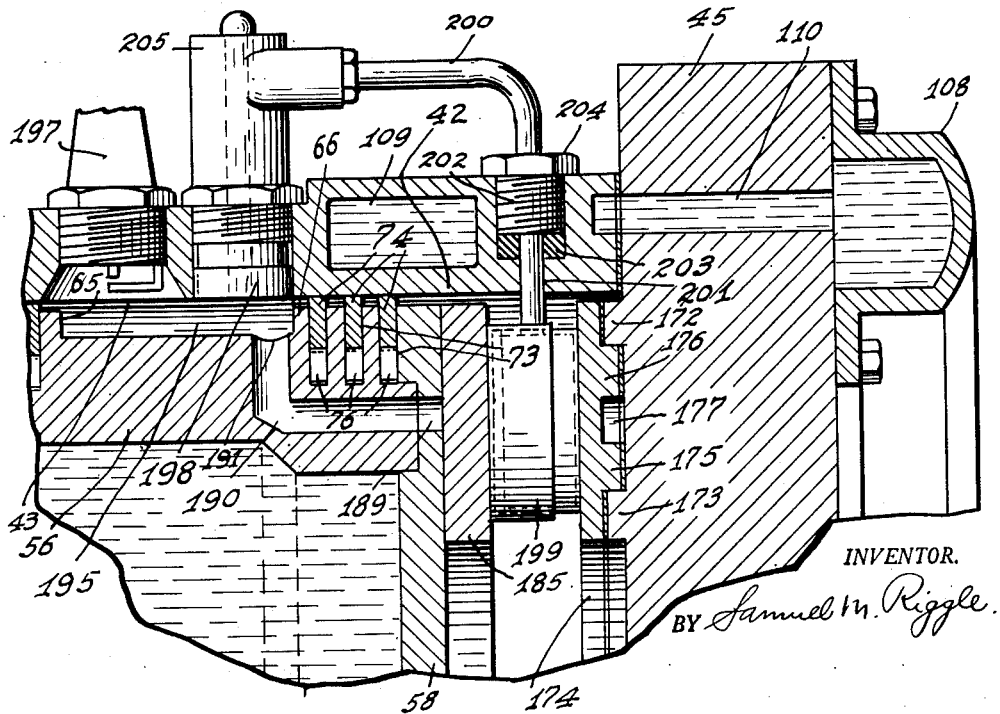
Fig. 29 is a sectional view showing an explosion chamber Sylphon, a flashport ring Sylphon, the rotor compression-transfer conduit, the compression-transfer flashport ring and the compression-transfer timing ring at the phase of rotation during which the charges in the explosion chambers are ignited.

Also mounted in threaded bores through stator shell 42 communicating with explosion chambers 195 are explosion chamber Sylphons 198, located axially in line with said spark plugs and between said spark plugs and the plane of the rotor power stroke-exhaust channel cylindrical wall 66, see Fig. 29.

Flashport ring Sylphons 199 mounted between flashport ring 185 and timing ring 174 communicate with explosion chamber Sylphons 198 through Sylphon tubes 200, see Fig. 29. Sylphon tube bores 201 and Sylphon tube threaded counterbores 202, with Sylphon tube packing rings 203 and packing nuts 204, provide an oil-tight entrance of Sylphon tubes 200 through stator shell 42, see Fig. 29. Explosion chamber Sylphons 198 are provided with Sylphon fittings 205 providing proper connections with Sylphon tubes 200 and providing a means of charging explosion chamber Sylphons 198 and flashport ring Sylphons 199 and the Sylphon tubes 200 with suitable hydraulic fluid, see Fig. 29. The purpose of explosion chamber Sylphons 198 and flashport ring Sylphons 199 and their fittings is to provide a means of counteracting the backpressure of the gases in said explosion chamber through rotor shell conduits 190 and rotor end plate conduits 189 against the axially inside wall of flashport ring 185 during the phase of rotation when the rotor outside ports of conduits 189 and the flashport bores 186 are not in registration. The purpose of the flashport ring springs 188 is to urge the flashport ring 185 axially inward with suitable pressure into engagement with rotor end plate 58 at all phases of rotation. By means of said explosion chamber Sylphons and said flashport ring Sylphons and their fittings the backpressure of the explosion chambers exerted axially outwardly against said flashport ring may be counteracted by an equal pressure applied by said flashport ring Sylphons between the timing ring 174, which is stationary, and the flashport ring 185, which is axially movable.

Inasmuch as by the above stated means the backpressure of the gases of the explosion chambers against the axially-inside wall of the flashport ring may be effectually counterbalanced by an equal pressure applied to the opposite side of said flashport ring, the pressure of said flashport ring against rotor end plate 58 may be kept nearly constant at all phases of rotation by said flashport ring springs.

The gas-tight joints of timing ring bosses 183 engaging flashport ring counterbores 184 provide a means of compensating for the axial thermal expansion and contraction of said rotor and said stator with regard to the transfer of the compression-transfer gases from stator to rotor. The axial pressure of the gases against the outside of said flashport ring 185 within flashport ring counterbores 184 provides an additional means of urging said flashport ring into engagement with rotor end plate 58. When the present engine is in operation the stationary member 185 maintains gas-tight sliding contact with rotating member 58.

Inasmuch as rotor shell 56 is spaced from the stator inner cylindrical wall 43, the segmented seal rings 74 mounted in rotor seal ring channels 73, and vane seal bars 80 mounted in vane axial channels 79, maintain sliding gas-tight contact with the stator inner cylindrical wall 43 at all phases of rotation. Inasmuch as the said segmented seal rings and the said vane seal bars are radially moveable, being slidably mounted in their respective channels, during rotation the centrifugal force of said segmented seal rings and said vane seal bars tends to urge them radially outward into contact with said inner cylindrical wall 43 of said stator shell 42. The purpose of the seal ring centrifugal counterbalances 76 and the vane seal bar centrifugal counterbalances 82 is to counteract the centrifugal force of said segmented seal rings and said vane seal bars respectively caused by rotation. The purpose of the seal ring springs 76 and the vane seal bar springs 85, which are flat wavy springs, is to maintain engagement under suitable pressure of said segmented seal rings and said vane seal bars respectively with stator inner cylindrical wall 43.

The axial dimensions of the valve openings through valve sleeves 52—54 are equal to the axial dimensions of the rotor intake-compression channel 59 and the rotor power stroke-exhaust channel 60.

The axial dimensions of the said vane seal bars is greater than the axial dimension of the valve openings through said valve sleeves, and in the phase of rotation when said vane seal bars pass over the valve openings of said valve sleeves the ends of said vane seal bars maintain sliding contact with the inner cylindrical wall 43 and the radially inward end walls of said valve sleeves, see Fig. 9.

Although in the present engine the axial dimensions of the intake-compression valves and the power stroke-exhaust valves are equal, and therefore the axial dimensions of the rotor intake-compression channels and the power stroke-exhaust channels are equal, I desire to make it clear that the axial dimensions of the intake-compression valves and the intake-compression channels may be made greater than or less than the power stroke-exhaust valves and the power stroke-exhaust channels.

Pressure oiling tubes 206 supply oil under suitable pressure to segmented seal rings 74 through oil tube bores 207 through said stator shell, and said pressure oiling tubes are mounted by means of threaded oil tube nuts 209 engaging threaded oil tube counterbores 210, see Fig. 5.

The lubricating oil supplied to the valve lubrication chambers 212, which are the spaces enclosed by valve covers 211, is introduced through suitable pressure oiling tubes entering by suitable means the valve covers 211. The valve lubrication chambers 212 communicate with oil chambers 105 and 106 through bores 218 and 220 of stator shell 42 and bores 221 and 219 of valves sleeves 52—54, see Fig. 3. The oil chambers 105 and 106 communicate with the radial bearing 100 and the thrust bearings 101 through bores 222 and 223 in the stator end plates 44 and 45, see Fig. 3.

The valve covers 211 are mounted over the rocker arm shafts 111, their bearings and their abutments, the rocker arms and push rods, the valve arms, the valve linkages, and the valves, said valve covers being mounted partly on the valve sleeves and partly on the periphery of the stator shell, passing over the inlet abutments and the outlet abutments, see Fig. 1, and Fig. 3, and Fig. 4.

We shall now describe the method of operation of the present engine. A mixture of gasoline and air is supplied by suitable external means to intake conduit 155. When said rotor rotates, carrying said intake-compression vanes past the intake ports 156, said intake-compression vanes draw a charge of the fuel-air mixture into the compression chambers behind them, the intake-compression valves maintaining a sliding gas-tight contact by means of their valve seal bars with the intake-compression channel of cylindrical wall and side walls. As the intake-compression vanes continue to rotate they continue to draw the fuel-air mixture into the compression chambers behind them and at the same time they compress the fuel-air mixture drawn into the compression chambers each by its preceding intake-compression vane into the compression-transfer outlet conduits 157 through the inner ports 158. The check valves 165 open automatically under the superior pressure generated in the compression chambers, and as the intake-compression vanes pass the inner ports 158 the intake-compression valves 46 are lifted axially into the valve openings of valve sleeves 52—54, thus interrupting the sliding contact maintained by the intake-compression valves through their valve seal bars with the intake-compression channel cylindrical wall 61 and side walls 62—63 and the leading rise of the cam-shaped intake-compression vanes 67.

As the pressure in the compression chambers recedes the check valves are closed by the resilient action of their check valve springs and the superior pressure now temporarily present in the compression-transfer outlet conduits 157. The check valves remain closed while the intake compression vanes and their vane seal bars move past the intake-compression valve openings of said valve sleeves; and during this phase of rotation the intake-compression valves with their valve seal bars are withdrawn a sufficient distance into their valve openings of said valve sleeves by the action of the rocker arm shafts being actuated by the cam disks until the said intake-compression vanes and their vane seal bars have passed. When the intake-compression vanes and their vane seal bars have passed the intake-compression valve openings of the said valve sleeves a sufficient distance, the intake-compression valves with their valve seal bars are projected from their intake-compression openings of the said valve sleeves into engagement with the trailing rise of the cam-shaped intake-compression vanes. In this manner the fuel-air mixture continues to be supplied under suitable pressure to the compression-transfer outlet conduits.

From the said outlet conduits 157 the compressed fuel-air mixture flows through the compression-transfer external manifolds 170, the compression-transfer conduits of end plate 45, at which point the pressures present to be made available to the three explosion chambers of the present engine are equalized through the annular pressure-equalizing conduit 177, then through the compression-transfer timing ring conduits 194, the flashport bores 186 of flashport ring 185, and in proper phase of rotation through the compression-transfer conduits of end plate 58 and their arc-shaped space charge control channels 192, and through the compression-transfer conduits of rotor shell 56 into the explosion chambers 195.

The flashport bores 186 of the flashport ring 185 and the rotor outside ports of conduits 189 of end plate 58 come into registration as soon as the power stroke-exhaust valves and their valve seal bars are projected from the power stroke-exhaust valve openings of the said valve sleeves by action of the rocker arm shafts and their linkages being actuated by the cam disks, into contact with the training rise of the cam-shaped power stroke-exhaust vanes.

The flashport bores of the said flashport ring continue to be in registration with the rotor outside ports 189 and the space-charge control channels 192 until the power stroke-exhaust vanes and their vane seal bars have passed the spark plugs a suitable distance and a sufficient charge of fuel-air mixture has flowed into the said explosion chambers. At this point the flashport bores and the space-charge control channels go out of registration, and soon thereafter the charges in the said explosion chambers are ignited by the spark plugs.

The exploded gases in the explosion chambers drive the power stroke-exhaust vanes forward. When the power stroke-exhaust vanes pass the exhaust ports 160 the exhaust gases flow through the exhaust conduit 159 to the outside. As the rotor continues to rotate, and as the power stroke exhaust vanes approach the power stroke-exhaust valves, the power stroke-exhaust valves are caused by the rocker arm shafts and their linkages, being actuated by the cam disks, to recede into the power stroke-exhaust openings of the said valve sleeves until the said power stroke-exhaust vanes have passed. As soon as the power stroke-exhaust vanes have passed the power stroke-exhaust valve openings of said valve sleeves, and as the rotor continues to rotate, the said power stroke-exhaust valves with their valve seal bars are projected from the power stroke-exhaust valve openings of said valve sleeves into engagement with the trailing rises of said cam-shaped power stroke-exhaust vanes.

As soon as the power stroke-exhaust valves with their valve seal bars come into engagement with the trailing rises of the cam-shaped power stroke-exhaust vanes and have passed the rotor inside ports 191, the flashport bores come into registration with the said rotor outside ports, and new charges of the compressed fuel-air mixture flow into the said explosion chambers. And as the rotor continues to rotate, while the new charges of the fuel-air mixture flow into the explosion chambers and while those charges are being exploded and expanded behind the power stroke-exhaust vanes, each power stroke-exhaust vane drives the gases which have been exploded behind its preceding power stroke-exhaust vane at the preceding explosion through the exhaust conduit to the outside. Thus the intake-compression vanes continue to draw in and compress the fuel-air mixture, thus the fuel-air mixture under pressure continues to flow in proper phase of rotation into the explosion chambers behind the power stroke-exhaust vanes where it is exploded, and thus the gases behind the power stroke-exhaust vanes continue to drive the power stroke-exhaust vanes forward, and thus the power stroke-exhaust vanes continue to drive the exhaust gases through the exhaust conduits to the outside.

In the present engine the intake-compression valves are equally spaced around the stator shell at three points, and the power stroke-exhaust valves are also equally spaced around the stator, being axially in line with the intake-compression valves. The intake-compression vanes are equally spaced at three points around the periphery of the rotor, and the power stroke-exhaust vanes are also equally spaced at three points around the periphery of the rotor, being axially in line with the intake-compression vanes.

The functions of intake and compression are performed by the intake-compression parts of the present engine simultaneously with the functions of power stroke and exhaust performed by the power stroke-exhaust parts of the present engine. When the intake-compression valves recede from the leading rises of the intake-compression vanes, the power stroke-exhaust valves recede simultaneously from the leading rises of the power stroke-exhaust vanes. And when the intake-compression valves approach and engage the trailing rises of the intake-compression vanes, the power stroke-exhaust valves simultaneously approach and engage the trailing rises of the power stroke-exhaust vanes.

In the present engine there are three simultaneous explosions in the three explosion chambers, and there are three separate explosions in each explosion chamber during each revolution. But I desire to make it clear that other arrangements of the present invention are possible and feasible. Obviously an engine might be built having either two or four or more simultaneous explosions without departing from the principles of the present invention; and obviously the minimum number of explosions possible in the present invention would be one single explosion during each revolution. But also other combinations are possible: for instance, an engine using the elements of the present engine might be built having four intake-compression valves and four power stroke-exhaust valves equally spaced around the stator and having three intake-compression vanes and three power stroke-exhaust vanes equally spaced around the rotor, such an arrangement of parts giving twelve single and separate explosions during each revolution.

In the present engine the intake-compression vanes each draw behind them a charge of fuel-air mixture into the compression chambers, while at the same time they each compress before them the fuel-air mixture drawn into the compression chambers during the preceding one-third revolution by its preceding intake-compression vane. In like manner, as the gases in the explosion chambers drive the power stroke-exhaust vanes forward, each power stroke-exhaust vane drives before it to the outside the gases which have been exploded and expanded during the previous one-third revolution behind its preceding power stroke-exhaust vane.

It should be made clear that the space charge control lugs are designed so that they are interchangeable with spare sets of space charge control lugs having either longer or shorter arcuate dimensions as desired to shorten or lengthen the phase of rotation during which the charge of compressed fuel-air mixture flows into the explosion chambers.

The lubricating oil for oil chambers 105 and 106 may be introduced through and drained from threaded bores properly equipped with oil tubes and threaded oil tube nuts properly arranged on the stator end plate, which threaded bores, oil tubes and threaded oil tube nuts are not shown in the present drawings.

Having thus described my invention, what I claim as new and desire to secure by Letters Patent of the United States is:

1. In an internal combustion engine, the combination of a stator having a cylindrical chamber, with a rotor rotatably mounted in said chamber, said rotor having compression-transfer conduits, said stator having intake conduits and compression-transfer conduits and exhaust conduits, said stator carrying a compression-transfer timing ring, a compression-transfer flashport ring engaging said rotor, said stator carrying a plurality of explosion chamber Sylphons mounted in bores in said stator shell communicating with said explosion chambers, a plurality of flashport ring Sylphons mounted between said compression-transfer timing ring and said compression-transfer flashport ring and exerting pressure axially against said compression-transfer flashport ring and urging same into engagement with said rotor, said explosion chamber Sylphons being connected by hydraulic tubing to said flashport ring Sylphons.

2. In an internal combustion engine, the combination of a stator having a cylindrical chamber, with a rotor rotatably mounted in said chamber, said rotor having compression-transfer conduits, said stator having intake conduits and compression-transfer conduits and exhaust conduits, said stator carrying a compression-transfer timing ring, a compression-transfer flashport ring engaging said rotor, said rotor power stroke-exhaust end plate having arc-shaped channels communicating with said rotor compression-transfer conduits and serving to extend the phase of registration of said rotor compression-transfer conduits with the flashports of said compression-transfer flashport ring, said rotor carrying in said arc-shaped channels of the rotor power stroke-exhaust end plate a plurality of space-charge control lugs with suitable mounting means providing a means of varying the length of the phase of rotation during which the explosion chambers are being charged.

3. In an internal combustion engine, the combination of a stator having a cylindrical chamber, with a rotor rotatably mounted in said chamber, said rotor having compression-transfer conduits, said stator having intake conduits and compression-transfer conduits and exhaust conduits, said stator carrying a compression-transfer timing ring, a compression-transfer flashport ring engaging said rotor, said compression-transfer timing ring being mounted on the inside wall of the power stroke-exhaust end plate of said stator in a rotatably adjustable manner, said compression-transfer timing ring having bosses for transferring the compression gases and for engaging said compression-transfer flashport ring, said compression-transfer timing ring cooperating with the said stator power stroke-exhaust end plate to form an annular compression-transfer equalizing conduit communicating with the bosses of said compression-transfer timing ring.

4. In an internal combustion engine, the combination of a stator having a cylindrical chamber, with a rotor rotatably mounted in said chamber, said rotor having compression-transfer conduits, said stator having intake conduits and compression-transfer conduits and exhaust conduits, said stator carrying a compression-transfer timing ring, a compression-transfer flashport ring engaging said rotor, said compression-transfer flashport ring being mounted in an axially slidable manner with gas-tight slip-joints on bosses of said compression-transfer timing ring for engaging said rotor with gas-tight sliding contact and having resilient means for urging such engagement.

5. In an internal combustion engine, the combination of a stator having a cylindrical chamber, with a rotor rotatably mounted in said chamber, said rotor having compression-transfer conduits, said stator having intake conduits and compression-transfer conduits and exhaust conduits, said stator carrying a compression-transfer timing ring, a compression-transfer flashport ring engaging said rotor, said stator carrying a plurality of explosion chamber Sylphons mounted in bores through the shell of said stator communicating with said explosion chambers, a plurality of flashport ring Sylphons mounted between said compression-transfer timing ring and said compression-transfer flashport ring for exerting pressure in an axial direction against said compression-transfer flashport ring and urging same into gas-tight sliding contact with said rotor, said explosion chamber Sylphons being connected by hydraulic tubing to said flashport ring Sylphons, said explosion chamber Sylphons and said hydraulic tubing and said flashport ring Sylphons, being filled with hydraulic fluid, said explosion chamber Sylphons being actuated by the pressure of the gases of said explosion chambers and actuating said flashport ring Sylphons by hydraulic pressure exerted through said hydraulic tubing, said explosion chamber Sylphons and said hydraulic tubing and said flashport ring Sylphons being adapted to counterbalance the pressure of the gases of said explosion chambers exerted through said rotor compression-transfer conduits against said compression-transfer flashport ring.

6. In an internal combustion engine, the combination of a stator having a cylindrical chamber, with a rotor rotatably mounted in said chamber, said stator carrying a plurality of explosion chamber Sylphons mounted in bores through the shell of said stator communicating with the explosion chambers and said explosion chamber Sylphons being actuated by the pressure of the gases in said explosion chambers, a plurality of flashport ring Sylphons mounted within said cylindrical chamber for exerting pressure in an axial direction against a compression-transfer flashport ring and urging same into gas-tight sliding contact with said rotor, said flashport ring Sylphons being actuated by means of hydraulic pressure exerted through hydraulic tubing by said explosion chamber Sylphons, said explosion chamber Sylphons and said hydraulic tubing and said flashport ring Sylphons being adapted to counterbalance the pressure of the gases of said explosion chambers exerted through the compression-transfer conduits of said rotor against said compression-transfer flashport ring.

7. In an internal combustion engine, the combination of a stator having a cylindrical chamber, with a rotor rotatably mounted in said chamber, said stator having a compression-transfer timing ring mounted in a rotatably adjustable manner on the inside wall of the power stroke-exhaust end plate of said stator, a compression-transfer flashport ring mounted in an axially slidable manner with gas-tight slip joints on bosses of said compression-transfer timing ring for engaging said rotor with gas-tight sliding contact and for transferring the compression gases through the flashports of said flashport ring into the compression-transfer conduits of said rotor during the phases of rotation during which the explosion chambers are being charged with the compression gases, and resilient means for urging said flashport ring into engagement with said rotor, said compression-transfer flashport ring serving to seal the outer ends of the rotor compression-transfer conduits during the phase of rotation in which said rotor compression-transfer conduits are not in registration with the flashports of said flashport ring.

8. In an internal combustion engine, the combination of a stator having a cylindrical chamber, with a rotor rotatably mounted in said chamber, said stator having a compression-transfer flashport ring engaging said rotor, a plurality of explosion chamber Sylphons mounted in bores in said stator shell communicating with said explosion chambers, a plurality of flashport ring Sylphons mounted between said compression-transfer flashport ring and said stator power stroke-exhaust end plate and exerting pressure axially against said compression-transfer flashport ring and urging same into gas-tight sliding contact with said rotor.

References Cited in the file of this patent

UNITED STATES PATENTS

| Number | Name | Date |
|---|---|---|
| 974,803 | De Lukacsevics | Nov. 8, 1910 |
| 992,096 | Wright et al. | May 9, 1911 |
| 1,184,114 | Matthews | May 23, 1916 |
| 1,405,326 | Powell | Jan. 31, 1922 |
| 1,754,787 | Flogaus | Apr. 15, 1930 |
| 1,894,480 | Beuoy | Jan. 17, 1933 |
| 1,968,982 | Barnaby et al. | Aug. 7, 1934 |
| 2,175,265 | Johnson | Oct. 10, 1939 |
| 2,196,675 | Humrichouse | Apr. 9, 1940 |
| 2,243,819 | Herrmann | May 27, 1941 |
| 2,288,831 | O'Harrow | July 7, 1942 |
| 2,358,165 | Ingram | Sept. 12, 1944 |

FOREIGN PATENTS

| Number | Country | Date |
|---|---|---|
| 494,433 | Great Britain | Oct. 26, 1938 |